No. 867,828. PATENTED OCT. 8, 1907.
G. W. McGILL.
TRACTION MACHINE.
APPLICATION FILED FEB. 19, 1907.
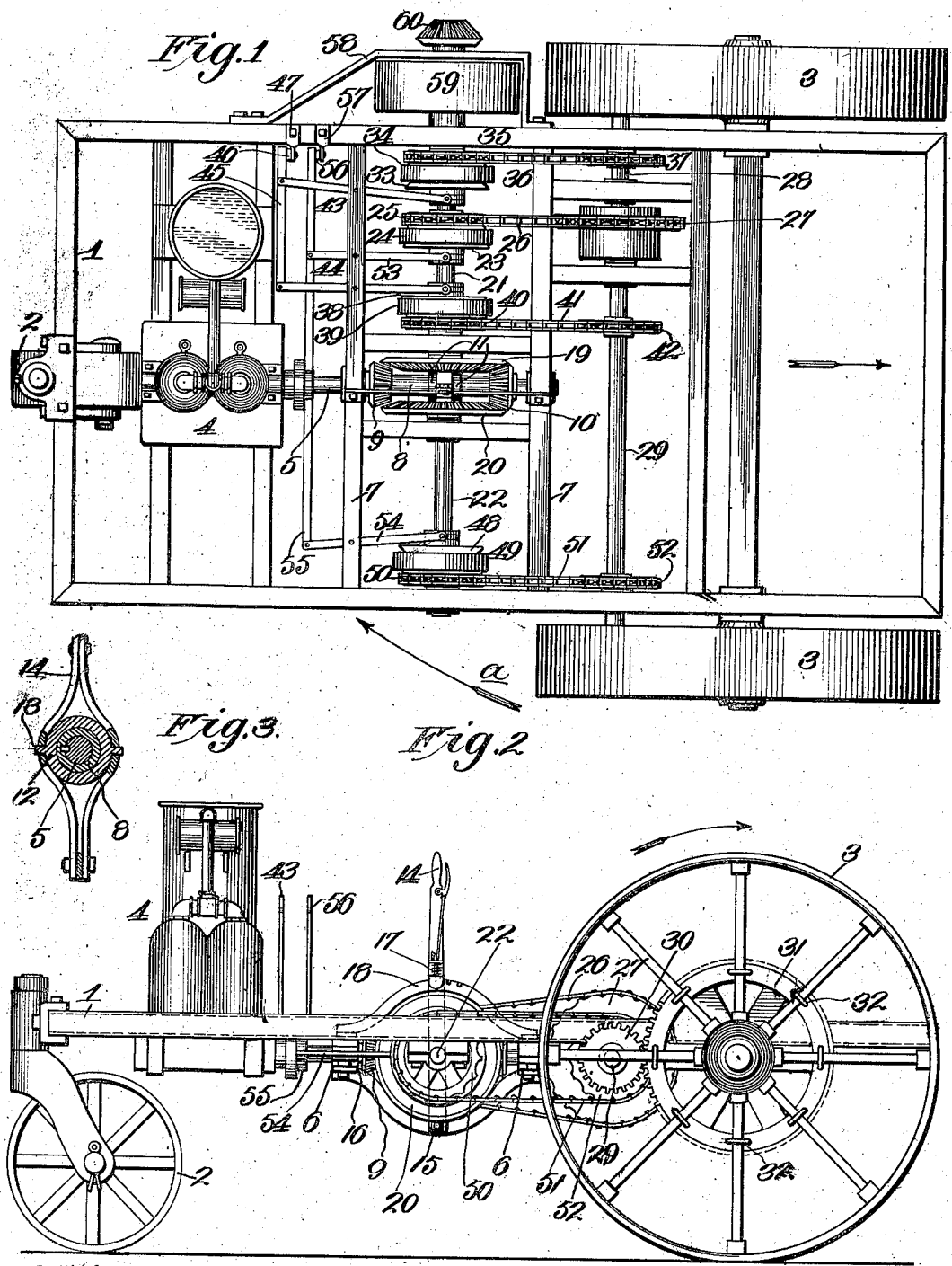

UNITED STATES PATENT OFFICE.

GEORGE W. McGILL, OF ENID, OKLAHOMA TERRITORY.

TRACTION-MACHINE.

No. 867,828.  Specification of Letters Patent.  Patented Oct. 8, 1907.

Application filed February 19, 1907. Serial No. 358,234.

*To all whom it may concern:*

Be it known that I, GEORGE W. MCGILL, a citizen of the United States, residing at Enid, in the county of Garfield and Territory of Oklahoma, have invented certain new and useful Improvements in Traction-Machines, of which the following is a specification.

This invention relates to traction machines and more especially to a traction machine of that character provided with two main or drive wheels and a caster, and my object is to produce a machine of this character adapted particularly for operating a header or mowing machine or a plow and equipped with means to enable the person in control to head the machine in the direction desired with ease and despatch and with no waste of grain and so disposed as to avoid traversing a tortuous course in its trips across the field.

A further object is to provide a machine with supplemental steering means for use particularly when the caster is trailing along at the rear of the machine.

A further object is to produce a machine of the type outlined which is of simple, strong, compact and durable construction.

To these ends the invention consists in certain novel and peculiar features of construction and organization as hereinafter described and claimed; and in order that it may be fully understood reference is to be had to the accompanying drawing, in which—

Figure 1, is a plan view of the framework portion of a traction machine embodying my invention. Fig. 2, is a side elevation of the same. Fig. 3, is a vertical section to show the relation between the sleeve and the lever for adjusting the same.

In the said drawings 1 indicates a frame preferably rectangular, and mounted at its front end on a caster 2, and at its rear end on the drive and supporting wheels 3.

4 indicates an engine of any suitable type and 5 the shaft of or a shaft driven by said engine and journaled in bearings 6 secured to cross bars 7 of the frame.

8 indicates a sleeve keyed to slide upon shaft 5 and to rotate with the same and said sleeve is provided at its opposite ends with gear pinions 9 and 10.

11 indicates a pair of collars rigid with sleeve 8 and 12 a ring journaled on the sleeve between the collars and provided with outwardly projecting pins 13 engaged by a lever 14 pivotally mounted as at 15 on a bracket 16 depending from the framework, said lever being equipped with the usual catch mechanism 17 for engagement with the notched sector 18 secured to cross bars 7, the notch of the sector with which the catch is engaged determining whether pinion 9 or pinion 10 or either of them shall be in engagement with a pair of large bevel gear wheels 19 and 20 mounted on the inner ends of a pair of shafts 21 and 22 journaled in the framework, it being noticed that said shafts 21 and 22 are always driven in opposite directions, for a purpose which hereinafter appears.

A clutch mechanism consists of a friction disk 23 keyed to slide upon and rotate with shaft 21, and a companion friction disk 24 equipped with sprocket wheel 25 connected by a chain 26 with a sprocket wheel 27 of that type known as a compensating wheel common in automobile construction. The compensating wheel 27 is mounted upon a pair of longitudinally alined shafts 28 and 29 suitably journaled and equipped at their outer ends with small gears 30 meshing with large gears 31 rotatable with wheels 3 preferably by being secured to the latter as shown at 32 in Fig. 2. The compensating wheel is adapted under ordinary conditions to rotate the shafts 28 and 29 at the same speed but to permit either of said shafts to be driven at a greater speed without interfering with the operation of the companion shaft.

Mounted on shaft 21 is a clutch consisting of a disk 33 arranged to slide upon and turn with shaft 21, and a companion disk 34 journaled on the shaft and equipped with a sprocket wheel 35 connected by chain 36 with a sprocket wheel 37 on shaft 28. Also mounted on shaft 21 is a clutch consisting of a disk 38 mounted to slide upon and rotate with shaft 21 and a disk 39 journaled on said shaft and equipped with a sprocket wheel 40, connected by a chain 41 with the sprocket wheel 42 on shaft 29.

When one of the shafts 28 and 29 is driven through the medium of its sprocket it will revolve more rapidly than its companion shaft driven through the medium of the compensating wheel and in order to guard against any possibility of both of the connected clutches being in operative position simultaneously, the disks 33 and 38 are pivotally connected in the usual manner to levers 43 and 44 pivoted to one of the cross bars 7 and said levers are pivotally connected by a link 45 pivotally connected to the lever 46 fulcrumed on a bracket 47 secured to the frame 1, the usual catch and sector mechanisms, not shown, being provided to secure lever 46 with both clutch mechanisms inoperative or with one of them in operative position and the other inoperative.

A fourth clutch mechanism consists of the friction disks 48 and 49, the former being arranged to slide upon and rotate with the shaft. Disk 49 is journaled upon the shaft and is provided with a sprocket wheel 50 connected by chain 51 with the sprocket wheel 52 mounted on shaft 29. 53 and 54 indicate levers pivotally connected to disks 23 and 48 in the usual manner and fulcrumed on cross bar 7, and 55 is a link pivotally connecting levers 53 and 54 and pivoted to a lever 56 fulcrumed on a bracket 57 mounted on frame 1, the usual catch and sector mechanism, not shown, being provided in order to permit the clutches connected to levers 53 and 54 to be both held inoperative or with one in operative position and the other inoperative.

58 is a bracket secured to one side of frame 1 and forming an additional journal for the outer end of shaft 21 and secured on said shaft within the bracket is belt wheel 59 for the purpose of operating stationary or other machinery when desired. On the outer end of the shaft is a bevel gear 60 to be geared to the cutting mechanism of a header, mower or other machine.

In practice when the header or mower is to be operated by the traction machine it is connected to the end of the same occupied by wheels 3. At such time the clutch connected to operate sprocket wheel 52 is disposed inoperatively as shown in Fig. 1, and the clutches connected to operate sprockets 37 and 42 are also disposed inoperatively, the clutch connected to the compensating wheel being arranged so as to transmit motion to the same and thence to wheels 3 through the medium of shafts 28 and 29 and gear wheels 30 and 31, the direction of rotation being in the direction indicated by the arrow Fig. 2 for the purpose of pushing the header or the mower as the case may be ahead of the traction machine. When the machine has traveled across a field, until the centers of the wheels 3, are approximately in line with the opposite side of the field from that from which the machine started and consequently when the cutting mechanism of the header or mower is beyond said side, the progress of the traction machine is arrested and the clutch connected to the compensating wheel is thrown out of gear and the clutch connected to sprocket wheel 52 into gear simultaneously without reversing the direction of movement of shaft 5. As a result of this action the wheel 3 at the left hand side of the machine, when traveling in the direction indicated by the arrow, Fig. 1, acts as a pivot or swivel and the reverse rotation imparted to wheel 52 causes the wheel 3 at the right hand side of the machine to travel backward in the direction indicated by the arrow a, Fig. 1, this action causing the machine to make a quarter turn and face to the right or at right angles to its original position. The lever 56 employed for throwing the clutch connected to the compensating wheel to inoperative position and the clutch connected to wheel 52 to operative position, is now reversed to restore said parts to their original relation when the machine again starts forward. It will be noticed that, by the manipulation of the engine described, the machine is caused to reverse its position and that of the header or mower in the swath just made and that in its second travel it may be caused to move directly at right angles or at any other angle in a direct line, the contour of the field determining its direction of travel as the grain is preferably cut from the outer side of the field. It will thus be seen that when the machine is traveling across the field, the clutch connected to wheel 52 is inoperative and that the compensating wheel revolves shafts 28 and 29 in the same direction and at the same speed and that consequently clutch disk 49 turns loosely on shaft 52 and in the opposite direction to the revolution of the same, as the latter is being driven through the medium of pinion 10 and gear wheel 20 in the opposite direction to that which pinion 10 and gear wheel 19 imparts to shaft 21.

If it is desired to back the machine without reversing the engine, lever 14 is manipulated to adjust sleeve 8 so as to throw pinion 10 out of and pinion 9 into engagement with bevel gears 19 and 20. If during the progress of the machine across the field with the header or mowing machine pushed ahead of the same and propelled through the medium of the compensating wheel as explained, it should be necessary to steer the machine to the right or left it may be accomplished by the manipulation of lever 46. Assuming that the machine is traveling in a stated direction and that the operator desires to steer slightly to the left, he operates said lever to throw the clutch connected to sprocket wheel 37 out of gear and the clutch connected to sprocket 42 into gear. This action because said sprocket wheels are smaller than the compensating wheel, accelerates the operation of shaft 29 and therefore causes right hand wheel 3 to rotate at a greater speed than the companion wheel 3 and guides the machine to the left. If it is desired to cause the left hand wheel 3 to revolve more rapidly than the right-hand wheel 3 said lever is manipulated to throw the clutch connected to sprocket wheel 42 out of gear and the clutch connected to sprocket 37 into gear, the result being the operation of shaft 28 is accelerated.

When the machine is to be employed for operating a plow, adapted to be secured to the frame in any suitable manner and at any desired point but preferably rearward of the axis of wheels 3, the engine 4 can be reversed or the lever 14 can be manipulated to throw pinion 9 into and pinion 10 out of engagement with bevel gears 19 and 20, it being apparent that in plowing it is desired that the caster end of the machine shall be the front end with the plow trailing behind. When the end of the row is reached and it is desired to continue the furrow at a right or any other angle, the clutch connected to the sprocket wheel 52 can be thrown into gear and the compensating wheel thrown out of gear simultaneously for the purpose of causing the machine to back around in a quarter of a circle as hereinbefore explained. When the machine is employed to pull a harrow or drill and is running with the caster wheel in front, one of the clutches for speeding the shafts connected to the main wheels can be thrown into operative condition and thus increase the speed of the right or left hand wheels and cause the machine to turn to the left or right as the case may be.

From the above description it will be apparent that I have produced a traction machine possessing the features of advantage enumerated as desirable and I wish it to be understood that I do not desire to be restricted to the exact details of construction shown and described as obvious modifications will suggest themselves to one skilled in the art.

Having thus described the invention what I claim as new and desire to secure by Letters Patent, is:—

1. A traction machine, comprising a frame, a pair of wheels and a caster supporting the same, a shaft geared to one of said wheels and a second shaft geared to the other of said wheels, a compensating wheel mounted on said shafts, means to operate said compensating wheel, and means whereby either of said shafts may be turned at a greater speed than that of the compensating wheel.

2. A traction machine, comprising a frame, a pair of wheels and a caster supporting the same, a shaft geared to one of said wheels and a second shaft geared to the other of said wheels, a compensating wheel mounted on said shafts, a driven shaft geared to the compensating wheel, a pair of clutches on the driven shaft and each geared to one of the first-named shafts, and means for operating and holding said clutches inoperative or one of them inoperative and the other operative.

3. A traction machine, comprising a frame, a pair of wheels and a caster supporting the same, a shaft geared to one of said wheels and a second shaft geared to the other of said wheels, a compensating wheel mounted on said shafts, a driven shaft geared to the compensating wheel, a pair of clutches on the driven shaft and each geared to one of the first-named shafts, and a lever connected to said clutches for operating and holding both of them inoperative or one inoperative and the other operative.

4. A traction machine, comprising a frame, a pair of wheels and a caster supporting the same, a shaft geared to one of said wheels and a second shaft geared to the other of said wheels, a compensating wheel mounted on said shafts, a pair of oppositely driven shafts, a clutch on one of the driven shafts geared to the compensating wheel, a clutch on the other driven shaft geared to one of the first-named shafts, and means for simultaneously operating said clutches and throwing one to inoperative condition and the other to operative position successively.

5. A traction machine, comprising a frame, a pair of wheels and a caster supporting the same, a shaft geared to one of said wheels and a second shaft geared to the other of said wheels, a compensating wheel mounted on said shafts, a driven shaft, a pair of shafts driven in opposite directions by said driven shaft, clutches mounted on the last-named shafts, a sprocket wheel and chain connection between one of said clutches and the compensating wheel, a sprocket wheel and chain connection between the other of said shafts and one of the shafts on which the compensating wheel is mounted, levers connected to said clutches, a link connecting said levers and a lever for operating said link to throw said clutches to inoperative position simultaneously, or to throw one of them to inoperative and the other to operative position successively.

6. A traction machine, comprising a frame, a pair of wheels and a caster supporting the same, a shaft geared to one of said wheels and a second shaft geared to the other of said wheels, a compensating wheel mounted on said shafts, a driven shaft, a pair of shafts suitably journaled and longitudinally alined and equipped with bevel gears, a clutch on one of said shafts and geared to the compensating wheel, a clutch on the other of said shafts and geared to one of the shafts on which the compensating wheel is mounted, a sleeve rotatable with and slidable longitudinally on the driven shaft and provided with oppositely facing pinions, means to cause one of said pinions or the other to simultaneously engage and the other to become disengaged from said bevel gears, and means for holding said clutches inoperative or for throwing one of them to inoperative and the other to operative position successively.

In testimony whereof I affix my signature, in the presence of two witnesses.

GEORGE W. McGILL.

Witnesses:
  P. R. BROWN,
  T. T. MAXWELL.